June 6, 1933.  A. G. RAYBURN  1,912,498
RESILIENT SUSPENSION FOR VEHICLE
Filed Feb. 27, 1930   7 Sheets-Sheet 1
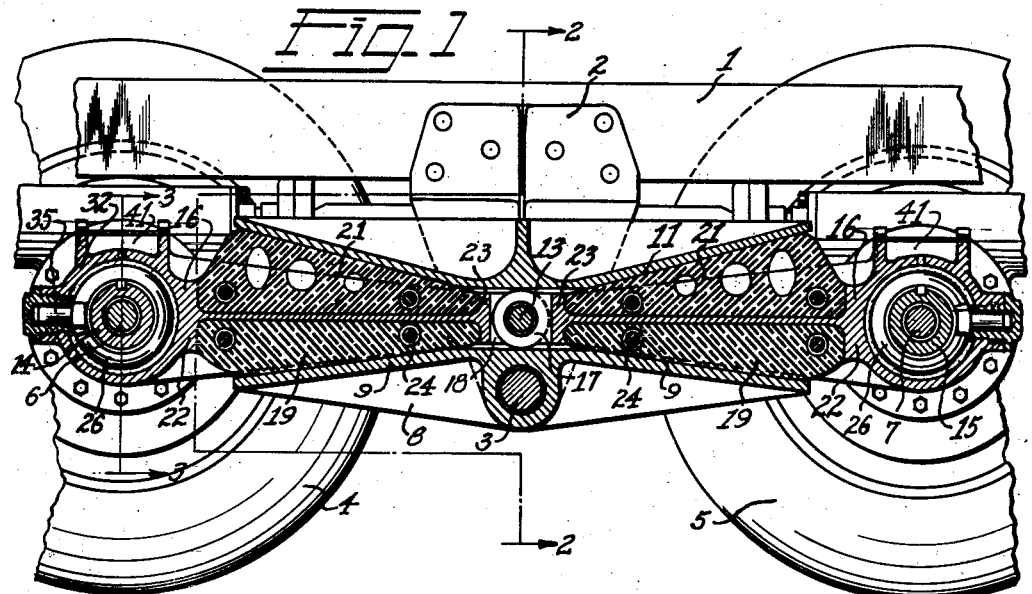
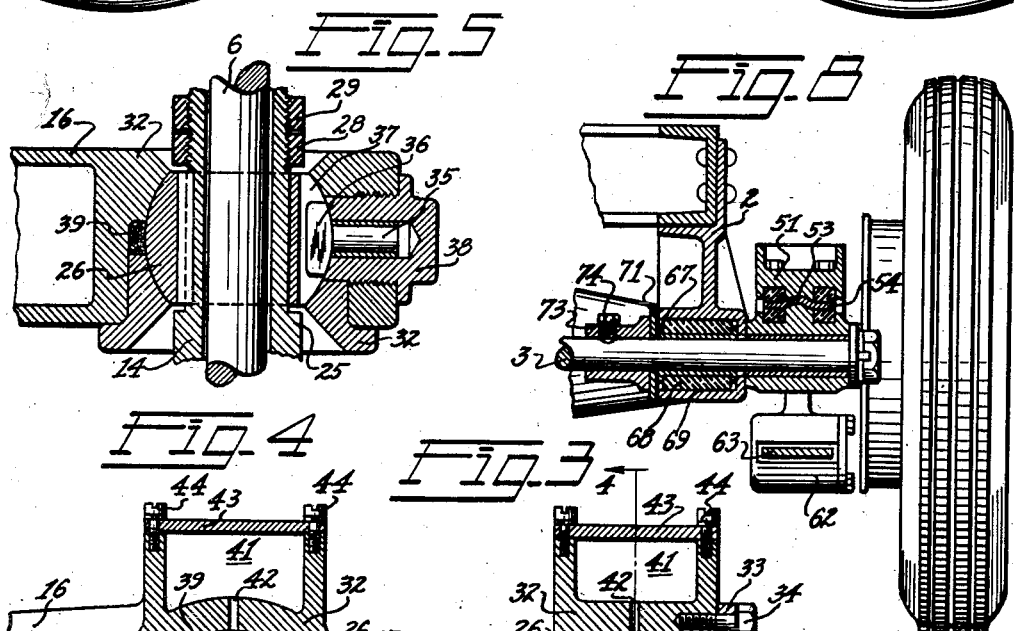
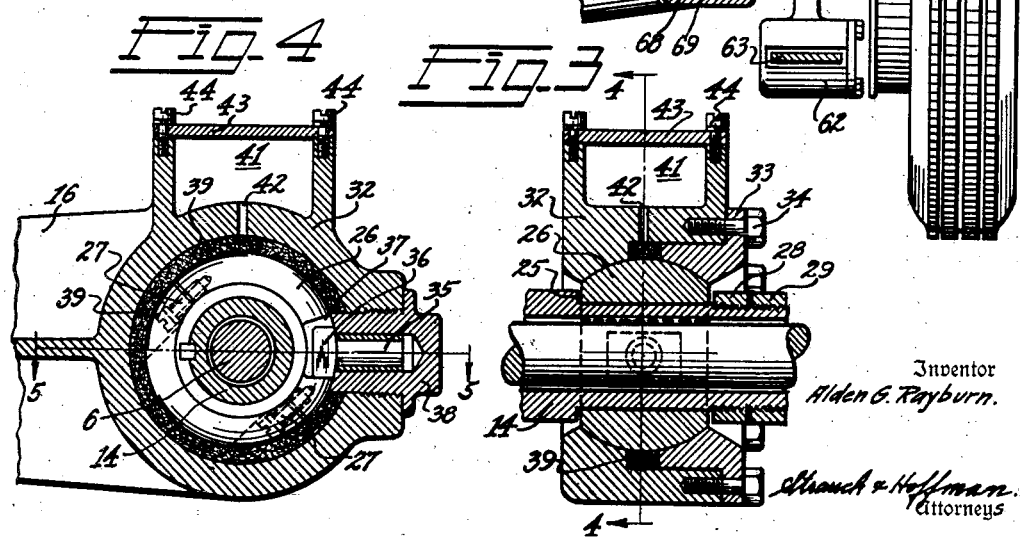
Inventor
Alden G. Rayburn.
Attorneys

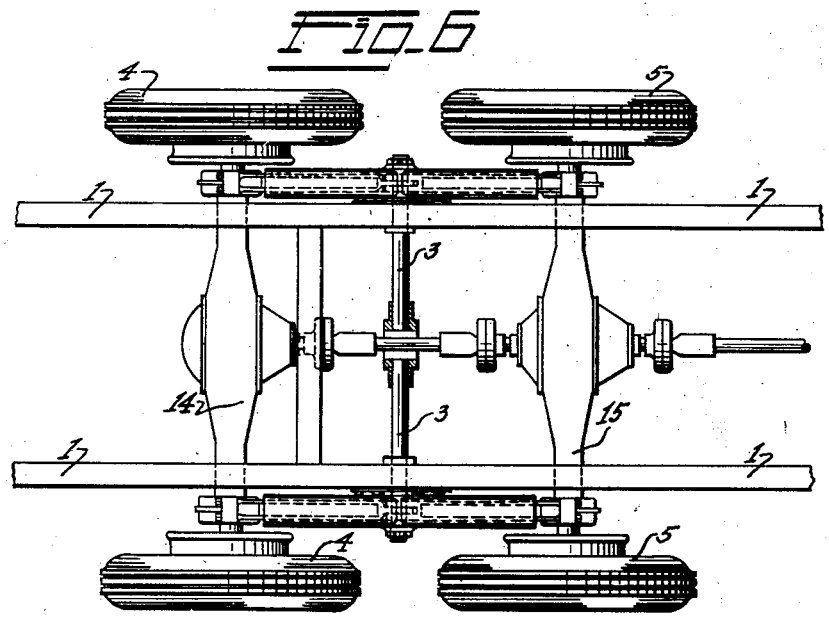
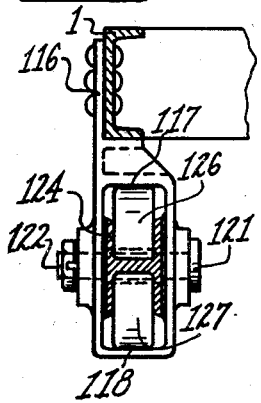
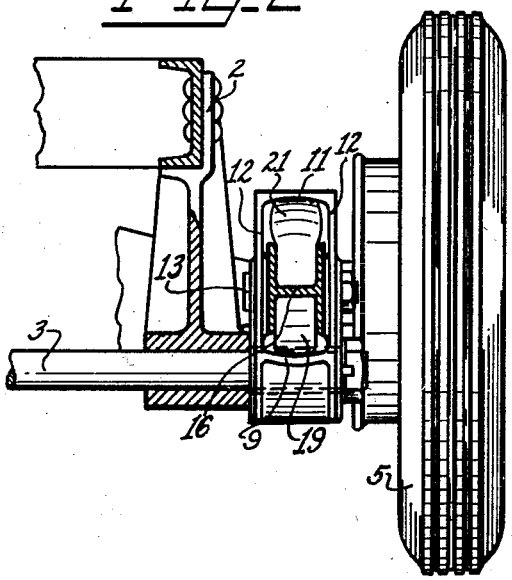

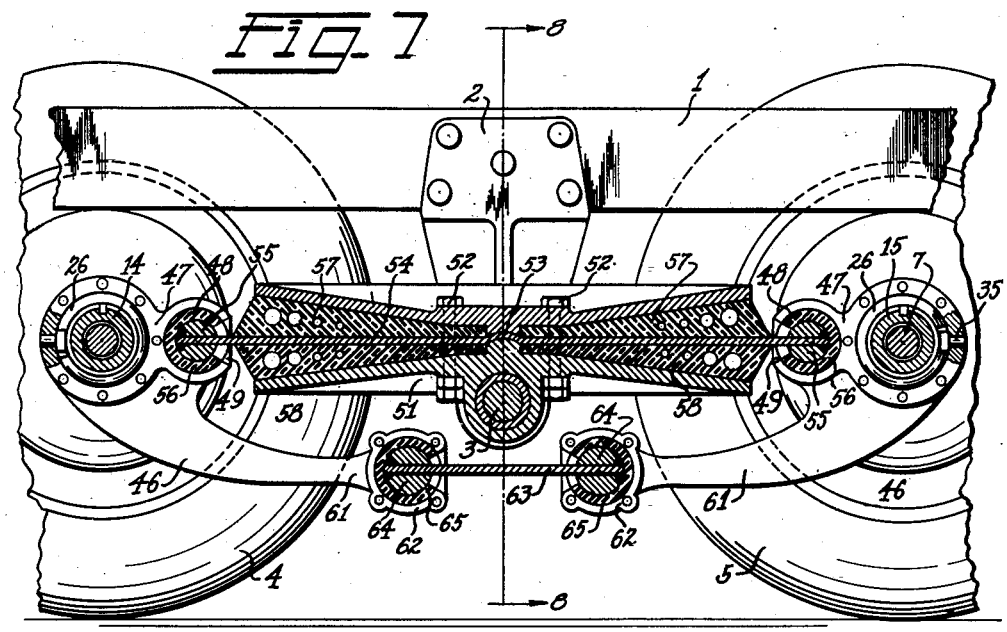
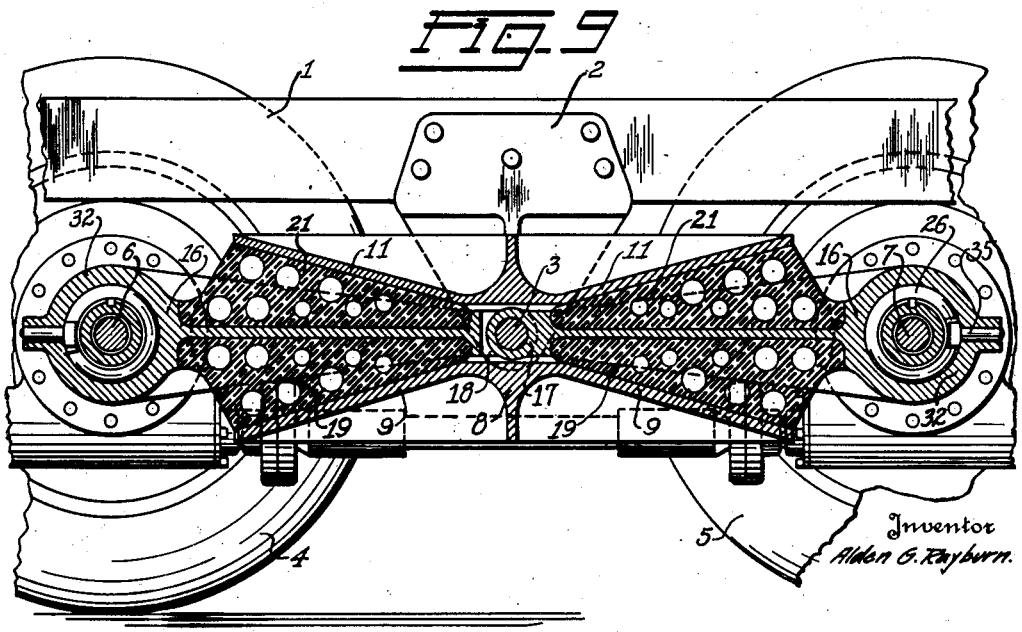

June 6, 1933.  A. G. RAYBURN  1,912,498
RESILIENT SUSPENSION FOR VEHICLE
Filed Feb. 27, 1930    7 Sheets-Sheet 4
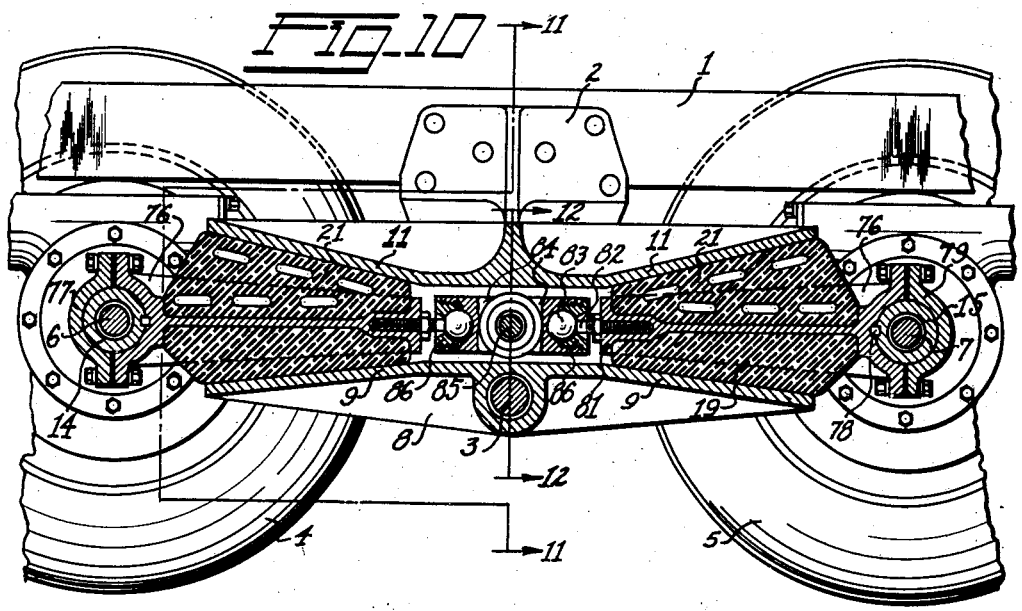
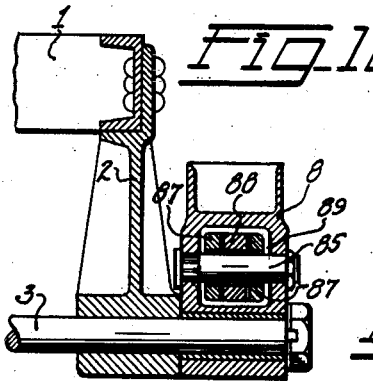
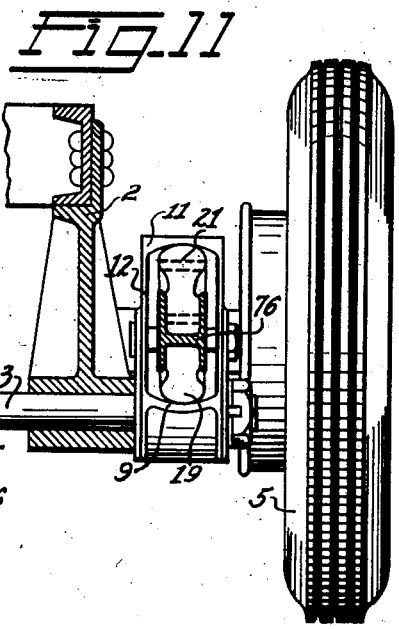
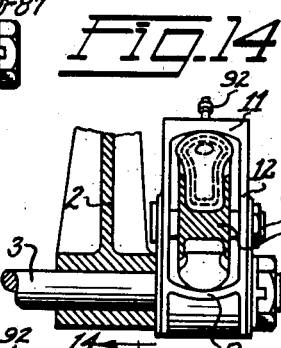
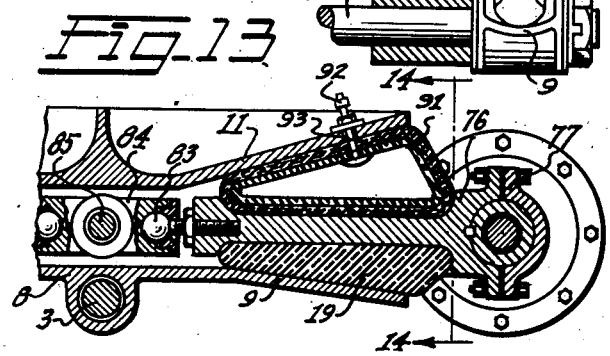

June 6, 1933.   A. G. RAYBURN   1,912,498
RESILIENT SUSPENSION FOR VEHICLE
Filed Feb. 27, 1930   7 Sheets-Sheet 5
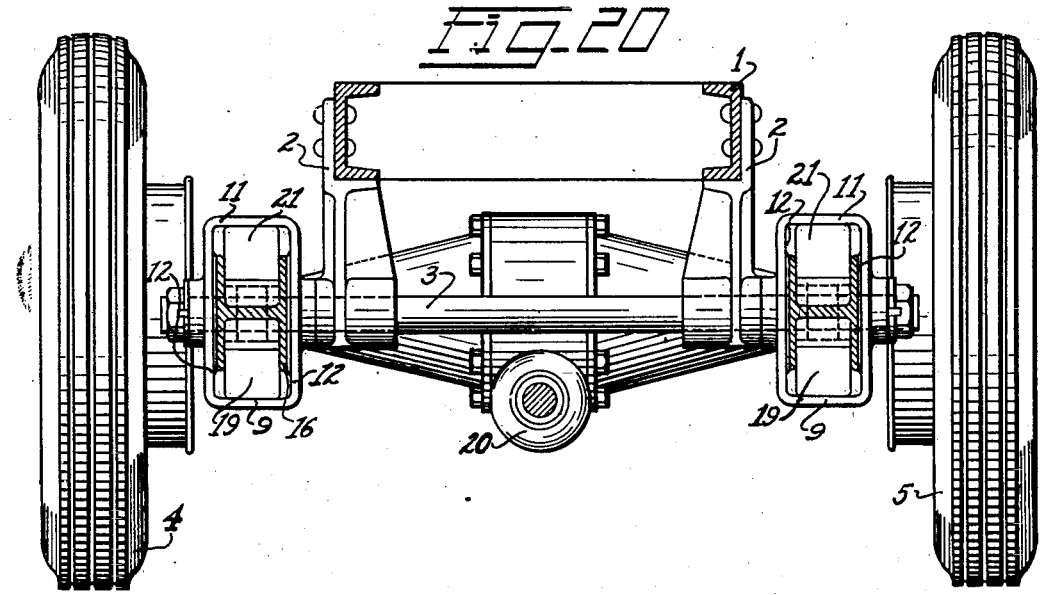
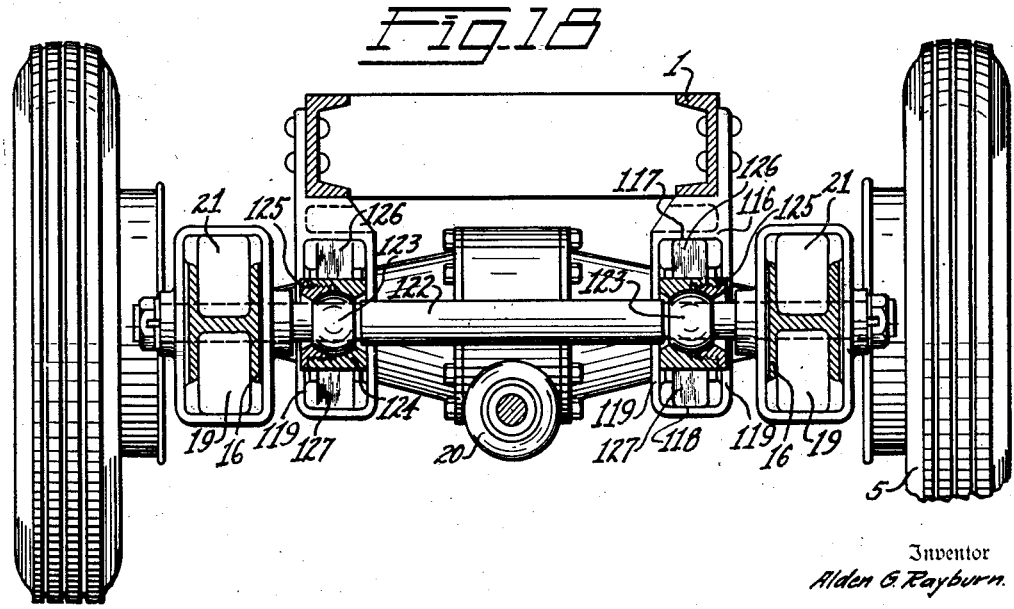
Inventor
Alden G. Rayburn.

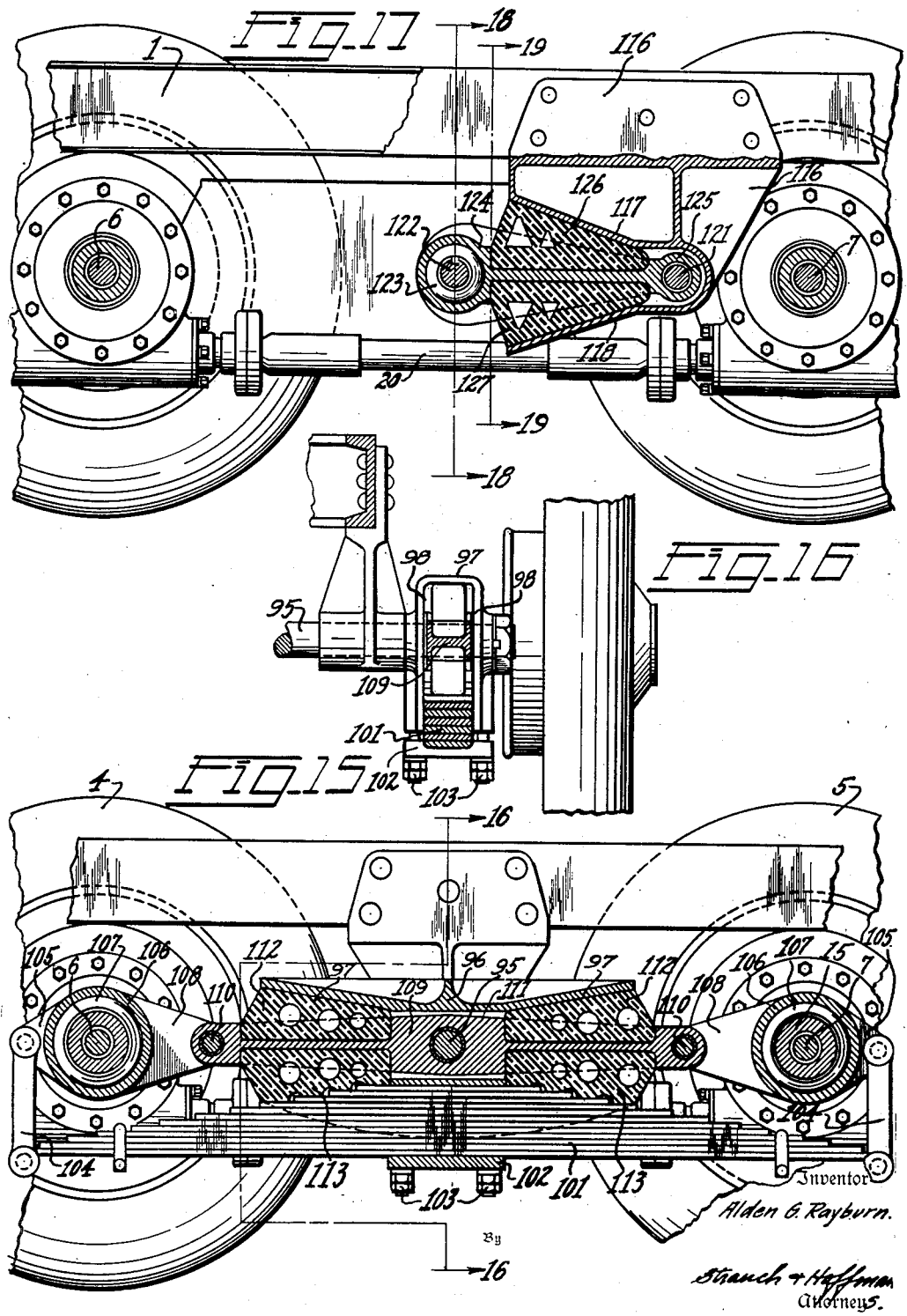

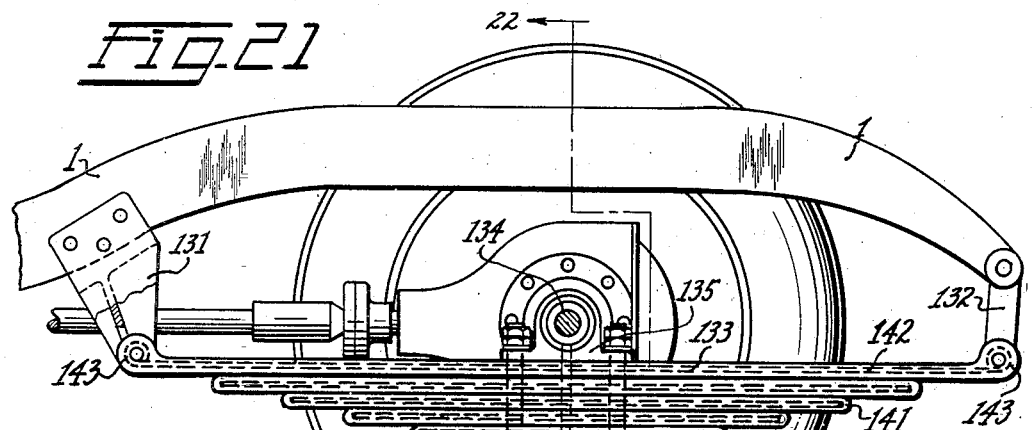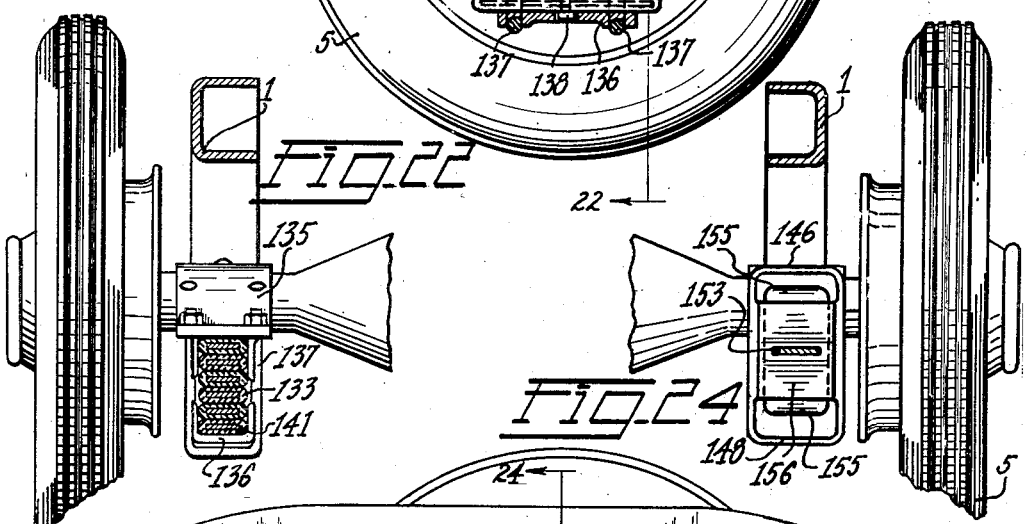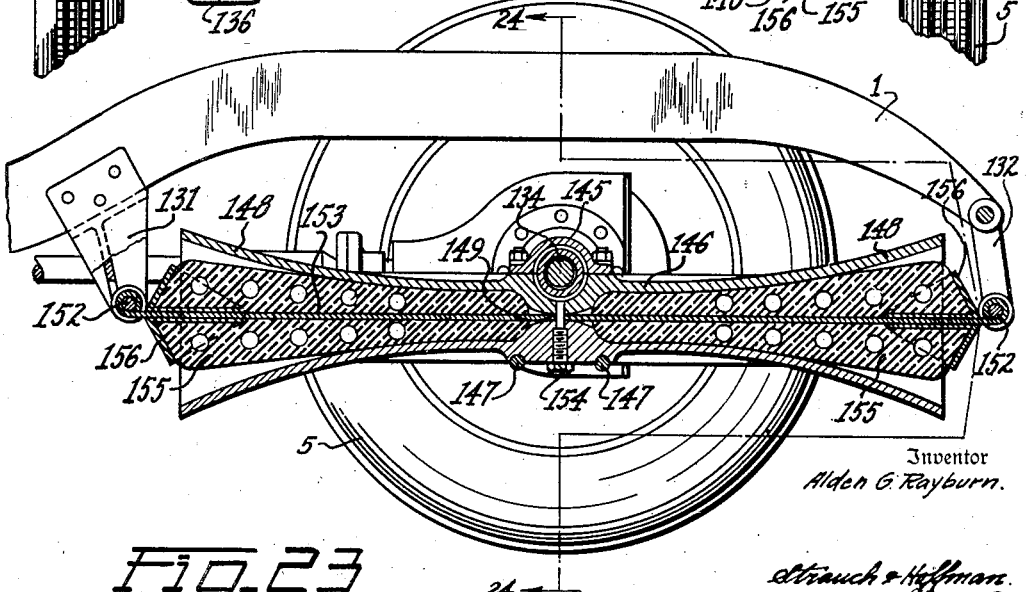

Patented June 6, 1933

1,912,498

UNITED STATES PATENT OFFICE

ALDEN G. RAYBURN, OF SAUSALITO, CALIFORNIA, ASSIGNOR, BY MESNE ASSIGNMENTS, TO AUTOMOTIVE ENGINEERING CORPORATION, A CORPORATION OF DELAWARE

RESILIENT SUSPENSION FOR VEHICLES

Application filed February 27, 1930. Serial No. 431,882.

This invention relates to a resilient suspension for vehicles such as motor trucks, buses, or coaches, rail cars, and the like, and the principal object thereof is to provide a suspension which gives the desired flexibility without allowing excessive movements of the frame with respect to the axles.

Another object of my invention is to provide a resilient suspension for a vehicle frame in which the cushioning of the vehicle frame with respect to the axles is accomplished by the use of resilient and deformable material instead of steel springs.

In the present-day suspensions for vehicle frames, it is common practice to provide very long flexible leaf springs to resiliently sustain the vehicle frame. These springs are made very flexible to effectively absorb minor road irregularities so that the frame is not affected thereby. However, when the springs are made sufficiently flexible to accomplish this result, there is too much flexibility for large road irregularities, and the re-bound from a large hole in the road is too great. Therefore, these long and flexible springs have been combined with various forms of shock absorbers, or re-bound checking devices, to give the desired softness or flexibility without the excessive movement when a large road irregularity is encountered.

Another object of my invention is to provide a resilient suspension for vehicles providing the desired softness or flexibility to effectively dampen or absorb small road irregularities, and which will furthermore be stiff enough to prevent excessive movement of the vehicle frame for larger holes in the road without the necessity for auxiliary devices such as shock absorbers or the like.

Another object of this invention is to provide a resilient suspension for the vehicle frame of a multi-wheel vehicle having tandem axles in which the tandem axles are connected to a common trunnion by members which extend longitudinally of the vehicle, with resilient and deformable material positioned adjacent these members, whereby vertical movements of the axles result in a flexing of the flexible and deformable material to dampen the movement of the parts.

Another object of this invention is to provide a resilient suspension for the tandem axles of vehicles with a common trunnion between said axles, and means connecting each axle to said trunnion, there being a pivoted housing or bracket adjacent said means, with resilient material, such as rubber, interposed between said housing and said means, whereby vertical movements of the axles are flexibly converted into oscillatory movements of said pivoted brackets, and resultant movements of the vehicle frame is greatly reduced.

Another object of this invention is to provide a resilient spring suspension for vehicles of the type having tandem axles with a common trunnion between axles, and having resilient and deformable material for reducing and dampening the vertical movements of the axles, with novel means for resiliently supporting the trunnion from the vehicle frame, whereby road shocks are materially dampened.

Another object of this invention is to provide a resilient suspension for the tandem axles of a multi-wheel vehicle embodying the interposition of resilient and deformable material between the axles and the vehicle frame, the mechanical connections between the vehicle frame and the axles having a universal joint type of hanger so constructed and arranged as to permit limited vertical movements of the axles without subjecting the torqueing members connected thereto to strains which they are not designed to withstand.

Another object of this invention is to provide a spring suspension for vehicles such as light automobiles or light delivery trucks, which suspension may be substituted for the usual elliptic springs wherein the axle is supported between the spring ends, said suspension including the interposition of resilient and deformable material between the axles and the vehicle frame in such manner that the amount of said material effective to flexibly support the vehicle is increased as the load on the vehicle is increased.

Another object of my invention is to provide a suspension as above described wherein the flexible and deformable material is positioned to roll upon a curved surface, the area of contact between the curved surface and the flexible material increasing progressively as the load on the vehicle increases.

Another object of this invention is to provide a spring suspension for light vehicles such as passenger cars or light delivery trucks in which the usual leaf spring has the various leaves thereof provided with resilient and deformable material therebetween, whereby the desired strength and flexibility of the usual leaf spring is obtained, with the additional flexibility provided by the resilient material.

By this construction each leaf of the leaf spring is separated from its adjacent leaf by resilient material, which material may be deformed by vertical movements of the vehicle frame, and which may also move longitudinally of the spring to add to the flexibility thereof.

Another object of this invention is to provide a resilient spring for vehicles embodying the interposition of flexible and deformable material to cushion the movements of the parts, said material being partly pneumatic and partly solid. By the use of a pneumatic member between moving parts, I am enabled to provide a resilient suspension in which the flexibility may be manually or automatically controlled by the air pressure contained within the pneumatic resilient member.

Another object of this invention is to provide a resilient suspension for the tandem axles of a multi-wheel vehicle in which a leaf spring is used to form the primary support for the load, and embodying the interposition of resilient and deformable material so arranged that the load is normally carried by the spring and the deformable material is flexed due to vertical movement of the parts.

Another object of this invention is to provide a suspension for the tandem axles of a multi-wheel vehicle in which the primary load is carried by leaf springs, and embodying the interposition of resilient and deformable material to cushion the vertical movements of the parts, and further embodying the positioning of resilient and deformable material against the leaf springs for dampening out oscillations and vibrations thereof.

These and various other objects of my invention will be apparent from the following description and the appended claims when taken in connection with the accompanying drawings wherein:

Figure 1 is a side elevation partly in section showing one form of my improved suspension as applied to the tandem axles of a multi-wheel vehicle.

Figure 2 is a section on line 2—2 of Figure 1.

Figure 3 is a section on line 3—3 of Figure 1.

Figure 4 is a section on line 4—4 of Figure 3.

Figure 5 is a section on line 5—5 of Figure 4.

Figure 6 is a top plan view of the tandem axles of a multi-wheel vehicle showing the relative positioning of the parts, said tandem axles being supported by any of the various forms of suspension as shown in this application.

Figure 7 is a view similar to Figure 1 showing another embodiment of my invention.

Figure 8 is a section on line 8—8 of Figure 7.

Figure 9 is a view similar to Figure 1 showing another embodiment of my invention.

Figure 10 is a view showing a further form of my invention.

Figure 11 is a section of line 11—11 of Figure 10.

Figure 12 is a section on line 12—12 of Figure 10.

Figure 13 is a broken view similar to Figure 10 showing a slightly modified form.

Figure 14 is a section on line 14—14 of Figure 13.

Figure 15 is a view similar to Figure 1 showing another embodiment of my invention.

Figure 16 is a section on line 16—16 of Figure 15.

Figure 17 is a central sectional view through the vehicle frame showing the novel resilient mounting for the trunnion thereof, which may be used with any of my suspensions for tandem axles of a multi-wheel vehicle.

Figure 18 is a transverse section through the frame of a multi-wheel vehicle having tandem axles, taken through the trunnion thereof and substantially on line 18—18 of Figure 17.

Figure 19 is a broken sectional view taken on line 19—19 of Figure 17.

Figure 20 is a transverse section through a vehicle having tandem axles and showing the shape of the H suspension members which support the axles from the common trunnion.

Figure 21 is a side elevation partly in section showing one embodiment of my invention designed particularly for light vehicles such as passenger cars or light delivery trucks.

Figure 22 is a section on line 22—22 of Figure 21.

Figure 23 is a view similar to Figure 21 showing another embodiment of my invention preferably adapted for light vehicles in which the flexibility of the suspension automatically compensates for the load thereon.

Figure 24 is a section on line 24—24 of Figure 23.

Referring to Figures 1 to 6 of the drawings, the vehicle frame 1 has a depending bracket 2 thereon in which is pivotally supported the trunnion 3 positioned approximately midway between the wheels 4 and 5 of the vehicle and below the axles 6 and 7 thereof. A bracket 8 is pivotally supported on the trunnion 3, the bracket 8 comprising a unitary member having outwardly spacing flaring chambers therein. These flared chambers are provided with the lower wall 9 and the upper wall 11 connected by the vertical wall 12, as more clearly seen in Figure 2. As seen from Figure 1, the supporting bracket 8 has a central cavity at the junction of the two flaring cavities therein and a pivot pin 13 passes through the bracket 8. The pivot pin 13 is in the horizontal plane defined by the axles 6 and 7 and draw bar pull of the vehicle is taken in a direct thrust against the pin 13.

The axles 6 and 7 are positioned in axle housings 14 and 15 and these housings are connected to the pin 13 by rigid members which have an H cross section. The H members 16 are pivoted on the pin 13 as seen, for example, in Figures 2 and 12 one of said members having a perforated section 17 positioned between correspondingly perforated portions 18 of the H section. The H members 16 extend outwardly through the flaring openings provided in the bracket 8, the depth of the H section increasing toward the flaring end of said cavities.

The vertical walls of the H section 16 are so spaced as to be slidably received between the vertical walls 12 of the bracket 8. Positioned between the vertical walls of the H members 16 are rubber cushioning members 19 and 21, said cushioning members being correspondingly shaped to rest against and engage the lower walls 9 and the upper walls 11 of the bracket 8. These rubber cushioning members bear against the horizontal portions of the H members 16 and are positioned between shoulders 22 and 23, the shoulder 23 being adjacent the portions 17 and 18 of the H mamber, wherein said members are pivoted on the pivot pin 13 therein.

As seen in Figure 1, the upper resilient cushioning members 21 are of greater depth than the lower member 19 and the upper members have cavities therein for adding to the resiliency of the rubber. These rubber cushioning members may be molded to fit in the H section 16 and they may be further secured thereto by cross rivets 24 secured in the vertical walls of the H members 16.

At their ends adjacent the axles 6 and 7 the H members 16 are provided with spherical sockets for engagement over correspondingly shaped ball hangers mounted on the axle housings 14 and 15. The ball hanger connection between the H section 16 and the axle housings are of a universal joint type whereby the torque reaction of a multi-wheel vehicle having tandem axles may be taken at both sides of both tandem axles, since the universal type joint hanger allows full play of the axles in all directions while maintaining full torqueing reactions.

The ball hanger connection between the H section 16 and the axle housings are shown in detail in Figures 3, 4 and 5. The axle housing 14 has a reduced section thereon providing a shoulder 25, upon which section is mounted a spherical member 26 made up of two like parts secured to the axle housings by bolts 27. Beyond the spherical member 26 on each axle housing is threaded a retaining nut 28 and a lock nut 29, the retaining nut 28 being slightly spaced from the annular ring member 26, the shoulder 25 and nut 28, thus allowing slight longitudinal movement of the annular ball hanger 26 on the axle housing 14.

Mounted on the spherical external surface of each spherical member 26 is the torqueing and supporting H section members 16, having an internal surface correspondingly shaped to form a working fit with the spherical member 26 and secured thereto by a retaining ring 33 secured to the portion 32 of the H members 16 by bolts 34. The members 32 of the H sections are similar in construction and each member is secured to its ball hanger by a similar means. The actual torqueing between the axle housing 14 and the member 32 which is a part of the H section 16 is by way of a universal key 35 having a head 36 received in a slot 37 in the spherical ball hanger 26. As seen in Figure 5 the slot 37 is longer than the head 36 of the universal key to allow slight longitudinal movement of these parts without binding. Universal key 35 is carried in a plug 38 removably received in a threaded opening of the member 32, there being a bushing interposed between the universal key and the plug member. The inner end of the plug member 38 is spherically formed to engage the spherical external surface of the ball hanger 26.

The closure plate 33 has a notch therein to accommodate the plug member 38. In order to lubricate the engaging surfaces of the ball hanger the member 32 has a groove in the inner spherical surface thereof in which is positioned a felt washer 39 in communication with a lubricant reservoir 41 by a conduit 42. Reservoir 41 is provided by upwardly extending walls of the member 32 and is closed at its top by a removable plate 43 secured in position by bolts 44. When the chamber 41 is filled with lubricant, the felt washer 39 is continuously lubricated by way of the channel 42 and the spherical surfaces are continuously lubricated by rubbing of the spherical member 26 against the felt washer 39.

The split form of ball hanger 26 greatly simplifies the assembly of the parts on any form of axis. Although this form is shown and described in connection with my novel form of rubber suspension, it is understood that it is not so limited but may be used with various forms of torqueing reaction members for connecting the axles to a vehicle frame, whether the torque reactions are taken by the springs of the vehicle, or by separate torque rods.

The bottom of the slot 37 in the spherical member 26 is curved about the center of the axle, as seen in Figure 4, so that the corners of the head 36 of the key 35 will not engage the bottom of the slot during certain movements of the axles. Also the slot is wider than the head 36 as clearly seen in Figures 3 and 4 to allow rise and fall of the axles and housings without subjecting the housings to a twisting stress, as will be explained more fully.

The torqueing reactions of the axle housings 14 and 15 are transmitted to the vehicle frame or to the other axle by the ball hanger 26 which is slidably keyed on the axle housing, to the head 36 of the key 35 engaging one side wall of the slot 37, and thus to the end 32 of the H section 16. There is a limited longitudinal play of the hanger 26 on the axle housing 14, between the shoulders 25 and the lock nut 28 to allow the wheel on the opposite side of the vehicle and connected to the axle to move vertically without twisting the torqueing members. When one wheel rises from the horizontal level of the other wheel, the axle tilts vertically about the contact point of the wheels remaining on the level. Therefore, the entire axle and its housing must move in a large arc which causes the axle housing to shift slightly in relation to the torque arm hangers. Due to this movement the torque members will be moved crosswise of the vehicle, unless the supporting ball hanger can bodily slip longitudinally of the axle housings. With my construction the ball hangers 26 may slip along the axle housings within the limits of the shoulders 25 and the nuts 28 sufficiently to remain in alignment with the torqueing member 16. The normal right-angled relation between the torqueing member 16 moves and the axle housing changes, the torqueing member turning about the ball hanger 26 thus prevents any side stresses or misalignment of the torque arms.

For various degrees of movement of the axle housing 14 out of its normal horizontal plane the universal key 35 may rotate within the plug 38 about its own axis, whereby the axles may ride over irregularities in the road surface without twisting the H member 16, since, when the axle rises the end 32 of the H member 16 oscillates about the ball hanger 26 and the universal key rotates about its own axis.

By the above described novel construction of supports between an axle housing and its torqueing member, I am able to secure a universal joint effect which compensates fully for all abnormal positions of the axles due to road irregularities, and I may therefore use my supporting construction on both sides of all axles in multi-wheel vehicles, whether the torqueing members are rigid or flexible. The operation of the hanger as shown in details in Figures 3, 4 and 5 whereby the above results may be accomplished is as follows:

If a wheel on one side of the vehicle encounters a bump, the axle moves upwardly in a long arc about the pivotal support for its torque arm 16. If the opposite wheel on the same axle stays level, one end of the axle housing thus moves to a very limited extent longitudinally of the vehicle towards the pivotal support of its torque arm 16, such movement being much greater at the wheel which rises. By the provision of the clearance between the depth of the head 36 of the universal key and its slot 37, as seen in exaggerated form in Figure 4, the housing 14 and its ball hanger 26 may move in an arc about the pivotal support for its torqueing member 16 and the head 36 will not bind against the walls of the slot 37. Yet this clearance will not detrimentally interfere with the normal torque reactions between the ball hanger 26 and the member 32, since these members can never resist each other, which resistance would result if the universal key on the rising wheel did not release the axle housing.

With a rigid drive axle between opposite wheels, the driving or breaking torque will momentarily be released from the torque arm at the wheel which hits the bump and said torque will be maintained at the torqueing arm on the opposite wheel. However, when this action occurs, the head 36 of the universal key is released from torqueing reaction only a very small distance and there will be very little, if any, shock when the said head reengages the wall of its slot 37.

The operation of the embodiment of my invention shown in Figure 1, is as follows: The normal load of the vehicle will be vertically downward against the trunnion 3 and therefore vertically downward on the bracket 8. This downward thrust of the load will result in a compression of the upper rubber members 21 between the upper walls 11 of the bracket 8 and the horizontal portions of the H members 16. If an irregularity of the road surface is encountered such that both the wheels 4 and 5 are caused to rise, both of the H sections 16 will move upwardly at their outer ends to thus compress the upper rubber sections 21 slightly more than the normal compression of said members under load. Due to the fact that the rubber members 21 are of substantial size, and due also to the fact that these members have the openings therein, resultant upward movement to the vehicle frame is greatly reduced and dampened since the rubber can weave and flex to change its shape, and the frame of the vehicle does not receive the shock in the same proportion that would have been the case had metal springs been used.

When one wheel encounters a bump, for example, leading wheel 5, the right hand H member 16 moves upwardly about the pivot pin 13 to compress the upper section 21 on the right of Figure 1. It will be noted that the H members 16 are mechanically separated from one another and each of said members can oscillate about the pivot 13 without mechanically transferring the oscillation thereof to the other of said members. Therefore the movement of the right hand member 16 is transmitted to the left hand member thereof only by compression of the rubber sections 21 to the right against the upper wall 11 of the bracket 8 which results in a tilting of the bracket 8 in counter-clockwise direction about the trunnion 3.

This quick tilting of the bracket 8 moves the upper wall 11 to the left side of Figure 1 downwardly to thus compress the rubber block 21 to the left of Figure 1. Since the left hand wheel 4 is assumed to be on the ground the left hand H section 16 cannot move downwardly and therefore the left hand rubber section 21 is compressed against the horizontal portion of the left hand H section 16. But the left hand H section 16 is connected next to the vehicle frame by way of the pin 13 mounted on the bracket 8 by a long lever arm, and due to the flaring chambers in the bracket 8 the greatest compression on the upper rubber section 21 and therefore on the horizontal portion of the H member 16 is adjacent the left hand member 26. Therefore very little movement will be imparted to the pivot 13 and thus to the trunnion 3 by vertical movement of the H sections 16. The result is that the initial vertical rise of the wheel 5 causes the upper rubber section 21 to be compressed by movement of the bracket 8 about the trunnion 3 and said bracket 8 will assume a short fluttering movement about the trunnion 3, which flutter will be quickly dampened out by the rubber sections 21 assuming their normal position shown in Figure 1.

By the above described construction it will be seen that the vertical shock due to road irregularities are greatly dampened and modified, and resultant vertical thrusts on the vehicle frame is greatly reduced. This advantageous result is to a great extent due to the fact that the H sections 16 which carry the torqueing reactions and also carry the draw bar pull of the vehicle are individually pivoted about a common axis whereby vertical movement of one of said members are not directly transmitted to the other of said members, but on the contrary such vertical movements are transmitted from members 16 one to the other only by way of the rubber cushioning members 21 acting against the upper walls of the pivoted bracket 8. The lower resilient members 19 may be made of less amount of rubber than the upper members 21, since these members 19 need only take the rebound or upward movement of the load when an excessive irregularity on the road surface is encountered. By the use of the ball hanger construction shown in detail in Figures 3, 4 and 5, the tandem axles may be connected to the torqueing and thrust members 16 at four points, since this universal joint type of hanger allows the axle to have full play in all directions without subjecting the axles or axle housings or the torqueing members 16 to twisting strains.

Another advantageous feature of the suspension shown in Figure 1 is that there is a tendency to lift the load in starting up the vehicle. When the vehicle is started from a rest position the driving axles will exert a longitudinal pull on the H members 16 which pull will tend to move the pivot pin in the direction of movement. Pivot 13 mounted on the bracket 8 will therefore move in a short arc about the trunnion 3 upon which said member is pivoted and the bracket 8 will therefore assume an angular position whereas the horizontal portions of the H members will remain substantially in their original horizontal position. When this angular position of the bracket 8 is assumed, one of the upper sections 21 of the rubber is compressed downwardly against the H member 16, on the other side of the trunnion 3, the lower rubber section 19 is compressed against its member 16. There is thus a distinct tendency to return the bracket 8 carrying the pivot 13 to its original position above the trunnion 3 as shown in Figure 1. It will thus be seen that the resilient suspension as described, resiliently picks up the load when the vehicle is started from a rest position or when the vehicle is quickly accelerated. When the vehicle is started up the entire bogie including the tandem axles may move slightly forward with respect to the vehicle frame thus displacing the pivot 13 on its vertical position about the trunnion 3 and placing the rubber sections under additional compression beyond that to which they are normally compressed due to the load. There is thus substantially less shock when the clutch of the vehicle is suddenly engaged since the load is resiliently picked up.

Due to the fact that the rubber at the top of the H members 16, namely the rubber portions 21, are more flexible than the lower sections of rubber 19, the downward thrust on the bracket 8 when the same is displaced from its central position as shown in Figure 1, are greater than the upward thrusts thereon. Therefore the suspension is resiliently biased to its central position at all times, and will return to such position as soon as the load has been resiliently picked up, as above described.

Referring to the modification of my invention shown in Figures 7 and 8, wherein like reference characters indicate similar parts to those shown in Figures 1 to 6 inclusive, the axle housings 14 and 15 have the universal type ball hangers 26 mounted thereon as shown in Figures 3, 4 and 5. Mounted on the ball hangers 26 are supporting members 46, said members 46 carrying the universal keys 35 in a manner similar to the detail showing of Figures 4 and 5. The supporting members 46 have short lever arms 47 projecting inwardly therefrom and provided with cylindrical openings 48 with openings 49 therein facing toward the trunnion 3.

The trunnion 3 has mounted thereon the pivoted bracket 51 made up of two like parts and bolted together by bolts 52, said bracket 51 having the flaring openings facing toward the axles, as described in connection with Figure 1. The flaring openings in the bracket 51 are separated from one another above the trunnion 3 by a solid portion of each part of the bracket 51, there being a spherical channel 53 connecting the two flaring openings just above the trunnion 3. The metal spring 54 such as a master leaf of a spring, extends completely through the bracket 51 and has a correspondingly shaped spherical indentation at its center for engagement in the spherical slots 53 of the bracket 51. The spring member 54 has cylindrical portions 55 on opposite ends thereof for positioning in the cylindrical openings 48 of the short lever arm 47, with rubber sleeves 56 interposed therebetween. The master leaf 54 has the rubber sections 57 and 58 positioned above and below the same and within the flaring chambers of the pivoted bracket 51, said rubber members being suitably secured to the master leaf 54 as by bolting or otherwise.

The supporting brackets 46 have downwardly and inwardly extending lever arms 61 having cylindrical chambers 62 at their lower ends, said lower ends being connected by a tie rod 63 having on its ends cylindrical members 64 for positioning in the cylindrical channel 62, with rubber sleeves 65 interposed therebetween.

It will be seen at once that this modification of my invention differs from Figure 1 in that the master spring 54 is one member which extends on both sides of the trunnion 3 to connect the axles by a mechanical connection. By reference to Figure 8 it will be seen that the trunnion 3 is resiliently supported from the bracket 2 by means of a collar 67, having upturned ends, between which ends are positioned an annular rubber sleeve 68 for positioning within a chamber 69 on the bracket 2. The open end of the chamber 69 is closed by a washer 71 secured in position by a slidable collar 73 secured to the trunnion 3 by a set screw 74. By this construction it will be seen that the trunnion 3 may move vertically and universally to a limited extent within the chamber 69, such movements being cushioned by the rubber ring member 68.

The operation of this form of my invention is as follows: When the leading wheel 5 encounters an obstruction on the road surface the resultant upward movement of the bracket 46 on the right of Figure 3, moves the cylinder 48 on this end of the master leaf spring 54 upwardly to compress the upper right hand portion 57 of the resilient rubber, and setting up a short wave in the master leaf. This short wave or oscillation is effectively damped out by the rubber cushioning members 57 and 58 on both sides of the spring and the bracket 51 is given a slight oscillation in a counter-clockwise direction, thus compressing the upper rubber member 57 to the left side of Figure 7. However, the initial rise of wheel 5 resulted in a movement to the right of lever arm 61, thus pulling on the tie rod 62, and moving the lever arm 61 to the left of Figure 7 upwardly. However, the resultant movement of this lever 61 is reduced due to the absorption of part of the movement by the rubber sleeve 65 surrounding the cylindrical members 64 on the tie rod 63. The supporting member 46 to the left of Figure 7, is given a short oscillation in a counter-clockwise direction, to move the cylinder 55 to the left of Figure 7 upwardly a short distance. This upward movement is partially dampened due to the rubber sleeve 56, and the upper portion 57 of the rubber block is further compressed by the resultant upward movement of the master leaf spring 54. Thus vertical movement of the trunnion 3 is materially less than the original vertical movement of the axle and wheel 5, and therefore vertical movement of the frame of the vehicle is substantially reduced.

Some portion of the resultant vertical thrust on the trunnion 3 is absorbed by the resilient mounting thereof including the rubber member 68 shown in Figure 8, and shocks to the vehicle frame are greatly reduced and dampened.

The embodiment of my invention shown in Figure 9 resembles in some respects that of Figure 1, but differs therefrom in that the trunnion 3 is positioned in the horizontal plane of the axles 6 and 7 and the members 16 are pivoted directly on said trunnion. Similar reference characters indicate similar parts, it will be seen that the bracket 8 is shaped similarly to that shown in Figure 1 with the difference, however, that the H sections 16 are positioned midway between the upper walls 11 and the lower walls 9 of the bracket 8, whereby the upper rubber sections 21 are of the same thickness as the lower sections 19.

The H sections 16 are pivoted to the trunnion 3 in a similar manner to those of Figure 1, and as shown in detail in Figure 3. The portions 32 of the H members 16 carry the universal keys 35 for engagement in the slot 37 of the ball hangers 26, all as clearly described in connection with Figure 1.

The operation of this embodiment of my invention is as follows. Normally the vehicle load will place the upper rubber section 21 under compression between the horizontal portions of the H members 16 and the upper walls 11 of the bracket 8. When the leading wheel 5 encounters an obstruction on the road, said wheel rises carrying with it the axle 7. The H member 16 to the right of Figure 9 is thus caused to oscillate about the trunnion 3 in a counter-clockwise direction, thus placing the upper sections of rubber 21 to the right of the trunnion 3 under compression which action will cause the bracket 8 to oscillate counter-clockwise about the trunnion 3. This pivotal movement of the bracket 8 will compress the upper portions 21 of the rubber to the left of the trunnion 3 against the horizontal portion of the left H section 16. Due to the fact that I have provided mechanically separate members comprising the H section 16 for connecting the tandem axles with the trunnion 3, with flexible means for supporting said separate members, the initial rise of the wheel 5 has a greatly dampened effect upon the trunnion 3 and therefore upon the vehicle frame 1. Each of the members 16 is capable of independent oscillation with respect to the other of said members and there is therefore no direct transmission of movement from one to the other.

Referring now to the embodiment of my invention shown in Figures 10, 11 and 12, the frame 1 has the supporting bracket 2 thereon for carrying the trunnion 3, with a pivoted bracket 8 mounted on the trunnion 3 and shaped quite similarly to the bracket shown in Figure 1. However, in this embodiment of my invention I am able to secure the supporting and torqueing members corresponding to the H sections 16 of Figure 1, rigidly to the axle housings without the interposition of any ball hangers at these points. The advantageous feature in this embodiment of my invention is accomplished by the use of ball joints adjacent the pivotal connection positioned above the trunnion 3, and by the use of the rubber cushioning members.

In this form of my invention the supporting and torqueing members 76 are rigidly connected to the axle housings by clamping plates 77 encasing the axle housings 14 and 15 and rigidly connected thereto by means of a key 78 thus making up in effect a structure wherein the axle housings have two short arms rigidly connected thereto, one on each side of the vehicle frame to form in effect a wishbone structure. It will be understood that the members 76 may be integrally formed with the axle housings or otherwise rigidly secured thereto. The members 76 have an H cross-section as seen in Figure 11 for positioning between the vertical walls 12 of the bracket 8, the upper rubber members 21 positioned between the horizontal portion of the H members 76 and the upper walls 11 of the bracket 8 have openings therethrough to give greater resiliency to the upper portions of the rubber. As seen in Figure 11 both the upper section 21 and the lower rubber section 19 are cut away on their opposite vertical walls just above the H member 76 to allow greater flexibility in a manner to be described more fully.

At their inner ends the H members 76 have threaded portions 81 adapted for the reception of correspondingly threaded pins 82 having spherical members 83 on the outer end thereof. The threaded plugs 82 may be locked in position by lock nuts thereon. Each of the spherical members 83 is adapted to be received in a correspondingly shaped opening in a short lever 84, each lever 84 being independently pivoted about a pivot pin 85 on the bracket 8. A removable plug 86 is adapted to close the open end of the spherical cavity in the end of lever 84, said plug 86 having a spherical inner surface for cooperation with the balls 83.

The short levers 84 are mounted on the pivot pin 85 with clearance as clearly seen in Figure 12. One of said levers 84 is provided with two ears 87, positioned on both sides of a lug 88 of the other of said levers 84, the lug 88 and the ears 87 being separated and slidably journaled on the pivot pin 85. The lug 88 is also narrower than the space between the ears 87, and the ears 87 are narrower than the opening provided by the vertical wall 89 of the bracket 8. By the structure as thus described the short levers 84 are given a freedom of movement about the pivot pins 85 to accommodate all of the various angular positions in which the axles and axle housings may go.

The operation of this form of my invention is as follows. Due to the greater resiliency of the upper rubber portions 21 than the lower portions 19 the downward thrust of the load at the trunnion 3 balances the suspension in the central position as shown in Figure 6. This downward thrust tends to pull the bracket 8 downward and places the upper rubber sections 21 under compression. When an obstruction on the road is encountered by the leading wheel 5, for example, the axle housing 15 rises and swings in an arc about the ball joints 83, thus placing the upper rubber portion 21 to the right of the trunnion 3 under greater compression and thus tilting the bracket 8 counter-clockwise about the trunnion 3. This movement at once compresses the upper rubber section 21 to the left of the trunnion 3 and the pivoted bracket 8 may thus oscillate or flutter about the trunnion 3, whereby the resultant shock to the vehicle frame is greatly reduced.

The normal draw bar pull of the axles of the vehicle frame is a direct thrust or pull on the H members 76, the pins 82, the short levers 84, and the pivot pin 85, and to bracket 8 and thus to the trunnion 3. The torqueing reactions of the axles and axle housings are by way of the same members, resulting in a downward thrust upon the short levers 84 against their pivot pin 85 and trunnion 3, which results in a compression of the rubber.

When the axle housing 15 moves upwardly due to a road obstruction the wheels which hit the bump will rise and the axle housing will tend to twist longitudinally of the axis thereof since the wheel on the opposite side of the vehicle may remain in contact with the road in the level position. Such twisting of the axle housing is accommodated and compensated for in the above described suspension, since the H members 76 on each axle housing on opposite sides of the vehicle frame may move upwardly and rotate about their balls 83 without subjecting the axle housing to a twisting strain. When the axle housing takes the position above described it must furthermore move slightly transversely of the vehicle in a long arc about the wheel which remains in contact with the road surface. This action may take place in my suspension due to the clearance between the ears 87 and the lug 88 mounted on the pin 85 since these members have side clearance sufficiently to slip longitudinally on the pin 85 to accommodate the above-described movement.

It will thus be seen that the suspension described and shown in Figures 10, 11 and 12, is admirably adapted for rigid connection to four points on the tandem axles of a multi-wheel vehicle without the interposition of ball hangers on the axles since the suspension allows the axle housings to assume the various angular positions in use without subjecting the parts to undue strains. Due to the fact that the rubber cushioning members 21 and 19 have their vertical side walls concave the members may roll within the confines of the bracket 8 to accommodate the angular position of the axles and the axle housings.

In some forms of vehicles such as light delivery trucks or passenger cars it may be desirable to provide greater resiliency for the body of the vehicle. Such resiliency may be accomplished in various ways such as providing a more plastic or flexible rubber in the upper portions 21 of the suspension of Figures 10 to 12, or it may be accomplished by providing a pneumatic rubber section positioned above the H members 76. A pneumatic form of suspension of the above described type is shown in Figures 13 and 14.

Referring to Figures 13 and 14, in detail, the H section 76 is made with vertical walls extending above the horizontal walls thereof, said member having the ball socket 83 on the inner end thereof and the plates 77 for engagement over the axle housing, in a similar manner to Figures 10 to 12. Above the H section 76 and beneath the upper wall 11 of the bracket 8 is positioned a pneumatic cushioning rubber member 91 which may be reinforced with a cord fabric similar to that used in the construction of a cord tire and which has an inflating valve mechanism 92 passing through an opening 93 in the upper wall 11 of the bracket 8.

The operation of the forms shown in Figures 13 and 14 is quite similar to that of Figures 10 to 12, the pneumatic member 91 however offering greater resiliency for the vehicle frame. Since the pneumatic member is not subjected to frictional wear it may easily be made sufficiently strong to withstand various loads which may be positioned thereupon. Also the inflation of the member 91 may be calculated for various loads of the vehicle and instructions given to the vehicle operator for maintaining the proper pressure within the pneumatic member.

In the embodiment of my invention shown in Figures 15 and 16, I have combined the advantageous characterstics obtainable by the use of resilient supports comprising rubber members, in combination with a compensating suspension including a leaf spring, whereby vertical thrusts on the axles are transmitted in part longitudinally of the vehicle to the other tandem axle and are dissipated. This embodiment of my invention resembles in some respects the compensating form of spring suspension shown and described in my copending application Serial No. 426,082 filed: February 5, 1930; but embodies the resilient support wherein full advantage is taken of the rubber supporting members. In this form of my invention the trunnion 95 is positioned midway between the tandem axles 6 and 7 and in the horizontal plane of said axles, a bracket 96 is pivoted about the trunnion 95, said bracket including outwardly flaring upper walls 97 and vertical walls 98, said bracket having an open bottom. A leaf spring 101 is partially enclosed by the vertical walls 98 of the bracket 95 and is secured to said bracket by a lower plate 102 secured to the brackets by bolts 103.

The leaf spring 101 extends beyond the axles 6 and 7 and has links 104 pivoted at the ends thereof, said links being pivoted to short lever arm 105 of hangers 106. The hangers 106 are pivoted on the axle housings 14 and 15 by way of a ball hanger 107, said hangers having inwardly extending lever arms 108. In this form of my invention I contemplate the use of torque arms connecting the tandem axles to one another or to the vehicle for transmitting torque, and therefore I do not show the universal type joint of ball hanger as shown in Figures 3, 4 and 5 of this application. However, it will be understood that the modifications shown in Figures 15 and 16 may be equally well used with the ball hanger of Figures 3, 4 and 5, whereby it will be unnecessary to provide separate torqueing members for the axle housings. As shown in Figure 15, the members or hangers 106 are not adapted to transmit torque back to the trunnion 3 since said hangers are free to oscillate about the ball hangers 107 on the axle housings. However, if the universal type of key shown in Figures 3, 4 and 5 were used with its modification, the hangers 106 could be used for torque transmitting members without further modifications.

The inwardly extending lever arm 108 of the hangers 106 are pivoted at their inner ends to a rigid connecting member 109 which is of the H form and which is pivoted about the common trunnion 95, there being bushings interposed between said member 109 and the trunnion 95 and between the arms 108 and the H member 109. The H member 109 is provided with an enlarged portion 111 which is adapted to be slidably received between the vertical walls of the brackets 95 and which provides a clearance between the upper portions of wall 97 of the bracket 95 and the upper leaf of the leaf spring 101.

Positioned between the vertical walls of the H member 109 are the upper rubber members 112 and the lower rubber members 113, these rubber members being of approximately the same size and each having openings therethrough for adding to the resiliency thereof. As clearly seen in Figure 15 the upper rubber members 112 are adapted to engage the upper walls 97 of the bracket 95, and the lower rubber members 113 are so shaped as to compressively engage the upper surfaces of the leaf spring 101.

The form of my invention shown in Figures 15 and 16 operates as follows: It will be noted that I have provided a single trunnion midway between the axles upon which the entire suspension is carried, and when the vehicle is loaded and the suspension is in its central and balanced position, the rubber members 112 and 113 are not subjected to load stresses. When the vehicle is in the balanced position the downward thrust of the load is directly transmitted to a downward pull on the links 104 at the end of the leaf spring 101, to the short lever arms 105, and thus to the axles 6 and 7 by way of the hanger 106, and the ball hanger 107. Rotation of the hangers 106 due to the downward thrust of the load is prevented by the connection of the inwardly projecting lever arms 108 to the H member 109. Due to the fact that the various lever arms are of the same length and equally distanced from the axles 6 and 7, there is a balance of forces, and the suspension will maintain the position shown in Figure 15, and the rubber members are not stressed due to the load.

When an obstruction on the road is encountered by the leading wheels 5, the axle 7 moves vertically carrying upwardly the hanger 106, the lever arm 108 thereon and the lever arm 105 with the pivot pins thereon. The rise of pivot pin 110 to the right of Figure 15 raises the right hand end of the member 109 about the trunnion 95 as a pivot. At the same time the pivot pin connecting lever 105 with link 104 also moves vertically to give the short upward pull on the right hand end of the leaf 101, which thus sets up a short wave or oscillation in said leaf spring. When the H member 109 is tilted in a counter-clockwise direction due to the rise of the pivot pin 110 on the right, the upper rubber portion 112 is compressed against the upper walls 97 of the bracket 95 to thus resiliently cushion the movement of the H member 109. This tilting movement of the H member 109 will result in a compression of the lower section of rubber 113 on the left hand side of the pivot or trunnion 95, since the H member 109 is free to pivot. Since the resultant pressure against the upper wall 97 of bracket 95 to the right of the trunnion is at an angle, there is very little shock imparted to the vehicle frame by way of the trunnion 95, since the movement is absorbed in an oscillation of the bracket 95.

The short wave given to the leaf spring 101 by the original vertical movement of the axle 7 is to a great extent absorbed by the lower rubber members 113 in compression against the upper surface of the leaf spring 101. In order that this wave be transmitted throughout the length of the leaf spring 101 is is necessary that the individual leaves thereof reciprocate with respect to one another. The rubber cushioning members 113 in engagement with the upper leaves allow slight longitudinal movement of the sleeve, but materially dampen out such movement and absorb the shock due to the change of form of the rubber members. However, such shock which is transmitted to the left hand end of the suspension will result in a downward pull on the links 104 at the left side. The original counter-clockwise movement of the H member 109 gives a downward movement to the pivot pin 110 at the left of the trunnion 95 such that the hanger 106 moves counter-clockwise about its ball hanger 107 to thus pull upwardly on the links 104 and give an upward kick to the spring at the left hand end thereof. The short wave or oscillation thus set up in the leaf springs meets and dampens out the original oscillation set up therein by the movement of the right hand wheel 5.

Since the H member 109 is in exactly balanced relation during normal conditions, said member is free to oscillate about the trunnion 95 without lifting the load. But the oscillation of the member 109 is materially dampened and softened by the rubber members 112 and 113 on the side thereof, the upper rubber members 112 serving merely to tilt the pivoted bracket 96, and the lower rubber members 113 acting resiliently against the upper face of the spring 101. The lower rubber members 113 therefore serve a double function in that they dampen out oscillations in the leaf spring 101, and in that they dampen movement of the H member 109.

With the suspension constructed and arranged as above described the vehicle axles are free to rise without subjecting the parts thereof to severe strains which they are not designed to withstand, and resulting shocks to the vehicle frame is materially dampened and reduced.

With the various form of resilient suspensions as thus far described, the common trunnions upon which the suspensions are connected to the vehicle may be rigidly mounted on the vehicle frame. However, to more efficiently cushion and absorb resultant shocks to the vehicle frame, I have shown a novel form of resilient mounting for the trunnion in Figures 17 and 18. It will be understood that the resilient mounting for the trunnion shown in these Figures is equally well adapted for any of the various forms of resilient suspensions shown in my present application, and in fact this form of mounting for this suspension is of general application irrespective of the type of spring suspension used. This form of mounting for the trunnions of a multi-wheel vehicle having tandem axles is described and claimed broadly in my co-pending application S. N. 426,082. In this application this trunnion mounting is described in connection with my novel rubber mounting for the supporting members of the trunnion axles, since this resilient trunnion functions particularly well with the types of suspensions shown in this application and cooperate with said suspension to materially dampen the road shocks.

Referring now to Figures 17 and 18, the vehicle frame 1 has depending brackets 116 on opposite sides of the vehicle for mounting the suspension and the axles to the vehicle frame. Each bracket 116 is secured to the frame by a plurality of securing members such as rivets, and are positioned between the tandem axles of the multi-wheel vehicle but offset from this position, being closer to one axle than the other. Each bracket has an upper wall 117 and a lower wall 118 which flare outwardly toward the opposite axle, and the side walls 119 defining a hollow chamber with flaring upper and lower walls open at one end. Adjacent the closed end of this flaring chamber the vertical walls 119 are separated to provide a bearing for a pivot pin 121, which may, if desirable, extend across the vehicle frame and be supported by both brackets. Positioned midway between the axles 6 and 7 in the horizontal plane of the pivot pin 121 is a trunnion 122 which may correspond to the trunnion 3 shown in the various prior forms of my invention, or which may correspond to trunnion 95 shown in Figures 17 and 18. This trunnion 122 extends completely across the vehicle and is connected by the resilient spring described in prior forms of my invention and shown in this application to the two tandem axles. The trunnion 122 has two ball hangers 123 mounted thereon for limited longitudinal play on said trunnion. As shown in Figure 18, the ball hanger 123 is mounted slidably on the trunnion 122 but is prevented from turning by means of a key, but it will be obvious that various other forms of mounting may be used, which mounting will allow the ball hanger slight longitudinal movement with respect to the trunnion. Pivotally connecting the trunnion 122 and the pivot pin 121 are two members 124 which, as seen in Figure 18, are of H form and are slidably positioned between the vertical walls 119 of the hanger 116. Each H member 124 has a hub 125 at one end with an opening therethrough to receive the pivot pin 121, with a bushing therebetween. At the other end each member 124 has a hub with a spherical inner surface for cooperative engagement with a ball hanger 123, a removable closure plate 125 securing each member 124 on its ball hanger. Suitable lubricating means may be provided for the joints between the ball hangers 123 and the H members 124 such for example, as the lubricant reservoir 41 shown in detail in Figures 3, 4 and 5.

Each H member 124 has united thereto rubber cushioning members 126 above the horizontal portion thereof and rubber member 127 below the same. These rubber members are preferably molded to fit into the H member 124 and are enclosed between the vertical walls thereof and are shaped to be slidably received within the flaring chambers of the bracket 116. Each of the rubber members 126 and 127 have openings therethrough to provide resiliency to the same, and as seen in Figures 17 and 18 there is a clearance between the vertical walls 119 of the bracket 116 and the rubber members, to provide openings into which the rubber may flex when compressed by movement of the H member 124. Although these rubber members 126 and 127 are shown as being of solid rubber with openings therein, it will be understood that the invention is not so limited, since I may use other resilient means such as springs, pneumatic rubber, such as shown in Figure 13, a combination of the springs and rubber, whether pneumatic or solid The trunnion 122 extends beyond the ball hangers 123 and pivotally supports a resilient spring suspension. This spring suspension may be of any type disclosed in this application. This resilient mounting for a trunnion of a multi-wheel vehicle is especially effective when combined with any of the various forms of rubber mounting connecting the tandem axles with the trunnion. These rubber mountings for the supporting members function to effectively dampen out vertical shocks which would otherwise be transmitted to the vehicle frame, and the resilient trunnion mounting as shown and described further cooperates with this rubber mounting to provide a suspension wherein the minor vibration due to road irregularities are effectively dampened out such that they are practically not noticeable on the vehicle.

With the trunnion mounted as above described the operation is as follows: The pivot pin 121 may be mounted on the vehicle either in front or in back of the trunnion 122. If mounted in front of the trunnion the drive from the wheels to the vehicle will be a pushing motion, and if in the back of the trunnion the drive will be a pull, but in either case the longitudinal or draw bar strain will be taken by the H member 124, whether said member is in compression or tension. It is noted that the horizontal position of the pivot pin 121 of Figure 17 is the fully loaded position of the vehicle, and therefore the rubber members 127 are relieved to a great extent of any longitudinal tension. When an obstruction on the road is encountered, the rubber springs connected to the axles absorb to a great extent the vertical movement of the wheel. Any resulting vertical movement of the trunnion 122 however causes the member 124 to oscillate about the pivot pin 122 as a setter, thus compressing the other rubber member 126. Due to the openings in the member and due to the clearance between the sides thereof and the walls 119 of the supporting brackets the rubber member may flow or flex out of its normal shape. This condition causes the rubber to change form and the consequent movement of the rubber to a great extent absorbs the shock. As is well known, there is very little tendency to set up a wave or oscillation in a rubber member and therefore there is substantially no vibration transmitted to the vehicle frame. The resultant pressure against the upper wall 117 of the bracket 116 progressively increases the further the trunnion is moved from its normal position. Such small road shocks are practically unnoticeable on the vehicle frame and larger shocks will be materially softened and dampened.

The ball hangers 123 allow the trunnion to move transversely of the vehicle to a limited extent and also allow the trunion to tilt into a slanting position, as when one or both wheels on one side of the vehicle rise, without subjecting the H members 124 to torsional or twisting stresses.

Since the trunnion 122 may rise and fall vertically between controlled and resilient limits, I am enabled to eliminate many of the bracing trusses usually necessary in a multi-wheel vehicle to prevent the frame thereof from being warped or strained. When the trunnions of a long vehicle such as multi-wheel tandem axle vehicle are rigidly connected to the vehicle frame, said frame is subjected to enormous twisting and torsional strain due to the rise of one axle at one end of the vehicle when the other axle remains in road contact, or when one wheel on one side of the vehicle rises and the other wheels remain level. Prior to my invention it has been necessary to provide cross trusses to brace the frame against twisting strains when the axles assume the various angles, since the spring suspensions as prior to my invention did not effectively absorb the vertical shock and the trunnion to which the spring suspensions were connected were subjected to severe strains. With a trunnion mounted as just described, however, the trunnion may move vertically and may also twist due to the ball hanger 123 and such movements are not transmitted directly to the vehicle frame which therefore may be made materially lighter and with less number of bracing trusses.

In all of the various suspensions as described, I have shown an inverted worm drive, such as shown in Figure 20 and designated generally by reference character 20. As clearly seen from Figures 17 and 18, the trunnion 122 is positioned well above the worm drive 20 to allow ample clearance. If desirable the trunnion 122 can be bowed upwardly above the worm drive 20, or the trunnion need not extend completely across the vehicle since each side of the vehicle may have a separate trunnion.

In Figures 21 and 22 I have illustrated a modification of my rubber suspension, particularly adapted for, although not limited to, passenger cars or like commercial vehicles. In this form of my invention the frame 1 of the vehicle has a bracket 131 depending therefrom and a shackle link 132 to which are pivoted the opposite ends of a novel form of spring 133. The spring 133 is suspended from the axle 134 by a bracket 135 having a lower plate 136 and connected to the upper bracket 135 by U-bolts 137, there being a positioning bolt 138 extending through all of the leaves of the leaf spring for preventing longitudinal movement and maintaining alignment thereof.

The individual metallic steel leaves of the leaf spring 133 are entirely encased within a sheathing of rubber, preferably being molded within the rubber sheathing. These rubber sheathings 141 extend on both sides and both edges as well as over the ends of the steel leaves 142. The steel leaves 142 may have suitable perforations therein through which the rubber sheathings 141 may pass when molded around the steel springs, or the steel springs may be corrugated or otherwise arranged, whereby the rubber and metal are unitarily connected in such manner that they will not become separated during use. The master or top leaf of the leaf spring 133 has the usual eyes at the end thereof for connection to the bracket 131 and the links 132, and the rubber sheathings 141 extend around these eyes 143. When the spring is assembled as shown in Figures 21 and 22 it operates as follows. When the load is applied to the vehicle frame 1 the spring 131 bows downwardly at its two ends 143, and the double thickness of rubber between each leaf spring is caused to roll and flex. Therefore, for all direct vertical thrusts, the vehicle frame is resiliently supported by the inherent resiliency of the steel leaf members 142 and in addition thereto controlled by the inherent resiliency of the rubber sheathings 141. As is well known, a leaf spring having a plurality of leaves assembled is resilient due to the fact that the leaves may move longitudinally with respect to one another, the engaging faces of the individual leaves rubbing against the next adjacent face. In the usual practice it is necessary to provide lubricants between the individual leaves of the leaf spring to prevent friction thereof, and in some cases excessive lubrication between the leaves provides too great a flexibility for the spring. With the rubber sheathing positioned between each leaf, as above described, longitudinal movement of the leaves of the leaf spring causes the rubber to be flexed longitudinally of the spring out of its normal shape. Thus the rubber is caused to roll longitudinally of the leaf spring 133 to give a materially dampened effect to the longitudinal action of the spring. Oscillations or waves in the springs are most effectively dampened out by the interposition of the rubber sheathing, since the individual portions of the rubber may change shape and only partially transmit movement to the next adjacent leaf of the spring. As a result road shocks are dampened by the flexing of the steel members 142 of the springs, and are further dampened and controlled by flexing of the rubber sheathings 141 and shocks to the vehicle frame are materially reduced.

Another form of my invention, somewhat similar to that shown in Figures 21 and 22, is disclosed in Figures 23 and 24 although the springs shown in Figures 21 and 22 are longitudinally arranged, as regards the vehicle frame, it will be understood that the springs would be equally efficient if placed cross-wise or transverse of the vehicle frame, as is common practice in some light automobiles.

Referring to Figure 23, the vehicle frame 1 has the bracket 131 thereon and the depending link 132 arranged on opposite sides of the axle 134. A hanger bracket 145 is positioned above the axle 134 for mounting a flaring bracket member 146 by means of U-bolts 147.

The bracket 146 comprises two similarly shaped members which when assembled and secured by the bolts 147 provide two outwardly flaring chambers 148 on opposite sides of the axle 134, said chambers being closed at their adjacent ends except for a small channel 149 therethrough. Connected to the shackle pin 152 is a master leaf spring 153 which extends completely through the chambers 148 in the bracket 146 and through the channel 149 thereof. A screw 154 is engaged with the lower portion of the bracket 146 and passes through an opening in the master leaf spring 153 for positioning the same within the chambers 148.

The master spring 153 is molded within a rubber member 155 which member is shaped to be positioned within the walls of the flaring chambers 148 as seen on the drawings. Each rubber member 155 has openings therethrough for providing greater resiliency and flexibility thereof. It will be noted that the outer portions of the rubber members 155 do not flare outwardly as much as the members 148 whereby the surfaces in engagement between the upper and lower walls of the chambers 148 and rubber members 155 are less than the length of chambers 148. The master leaf spring 153 has secured adjacent its ends metallic retaining straps 156 which may be welded thereto, said straps 156 engaging over the ends of the rubber members 155 to prevent longitudinal displacement of said rubber members with respect to the leaf.

The operation of this embodiment of my invention is as follows. It will be noted first that the position of the parts shown in Figure 23, represents the normal loaded condition of the vehicle, and it will be seen that a distinct clearance is provided between the outer ends of the rubber members 155 and the flaring chambers 148. The downward thrust of the vehicle load is taken by the master leaf spring 153 which compresses the lower rubber members 155 against the bottom walls of the chambers 148, with a rolling action. When an obstruction on the road is encountered, and the vehicle axle 134 rises the rubber members 155 are rolled within the flaring chambers 148, the action between the spring 153 and the rubber members being a combined rolling action and flexing and deforming action of the rubber. By this novel construction road shocks are materially dampened and absorbed.

It will be particularly noted that the spring suspension of Figure 23 gives a relatively light and flexible spring member for light loads, since the ends of the springs 153 and the rubber members 155 which are not in contact with the chambers 148 may readily flex vertically without restraint. When the vehicle is thus lightly loaded only a portion of the rubber members 155 comes in contact with the flaring chambers 148, but when the vehicle is more heavily loaded, the surface of contact between the rubber members 155 and the chambers 148 is increased. Thus a heavier and stiffer spring suspension is automatically provided as the vehicle becomes loaded. By the provision of the flaring chambers 148 in combination with the rubber members 155 an efficient form of resilient suspension is provided, since the rubber is capable of rolling along the walls of the chambers 148 as well as being capable of changing its form when road shocks are encountered.

The forms of suspension shown in Figures 21 to 24 are admirably adapted for use with the well known Hotchkiss drive, since the torqueing reactions may be taken by the combined leaf spring and rubber members.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by United States Letters Patent is:—

1. A road vehicle comprising a frame, tandem axles thereon, a trunnion on said frame between the tandem axles, and a resilient suspension interposed between said axles and said trunnion comprising a bracket pivoted on said trunnion, means connecting each axle to said bracket and oscillatory with respect to said bracket, and rubber devices positioned between said means and said bracket to cushion oscillatory movements of said means.

2. The combination, with a multi-wheel vehicle having tandem axles, and a trunnion between said tandem axles, of a resilient suspension connecting said axles and the vehicle frame comprising swinging means mounted on each axle and pivotally connected to said trunnion, and resilient and deformable material such as rubber against which said means oscillates in expansive surface engagement due to vertical movements of said axles, said means and said material being so positioned and related that the swinging means are cushioned in all directions of oscillation.

3. The combination with a multi-wheel vehicle having tandem axles, a trunnion on the vehicle frame between the tandem axles, spherical members on said tandem axles, arms journalled on said spherical members and projecting inwardly, an oscillatory bracket pivoted on said trunnion and designed to receive said inwardly projecting arms, and resilient and deformable means interposed between said arms and said bracket.

4. The invention as defined in claim 3 wherein said bracket has vertically spaced walls between which said arms extend, and said resilient and deformable material is positioned above and below said arms and within said vertically spaced walls.

5. In a multi-wheel vehicle having tandem axles, a trunnion on the vehicle frame between said tandem axles, supporting arms mounted on said axles, a bracket pivoted on said trunnion and having vertically spaced walls positioned above and below said arms, means pivotally connecting said arms to said bracket and resilient and deformable material interposed between portions of said arms and the said walls of said bracket.

6. The invention as defined in claim 5 wherein said trunnion and said connecting means are vertically spaced from one another.

7. In a multi-wheel vehicle having tandem axles, a trunnion on the vehicle frame between said tandem axles, a bracket pivoted on said trunnion and having vertically spaced walls defining outwardly flaring chambers, an arm rigid on each axle and projecting into said flaring chambers, resilient and deformable means interposed between the upper and lower sides of said arms and said vertically spaced walls, a pivot on said bracket, and means connecting the inner ends of said arms to said pivot.

8. The invention as defined in claim 7 wherein the said last named means comprises short levers, said short levers being connected to the inner ends of said arms by universal joints.

9. The invention as defined in claim 7 wherein one of said resilient and deformable means includes a pneumatic member.

10. In a multi-wheel vehicle having tandem axles, a trunnion on the vehicle between said tandem axles, supporting arms on said axles and pivoted to said trunnion, a bracket pivoted on said trunnion and having vertically spaced walls above and below said supporting arms, and resilient and deformable material interposed between the vertically spaced walls of said bracket and said arms.

11. In a multi-wheel vehicle having tandem axles, spherical members mounted on said axles, supporting members mounted on said spherical members and having short inwardly projecting lever arms, a trunnion on the vehicle frame between the tandem axles, a bracket pivoted on said trunnion having upwardly flaring walls, means connecting the ends of said lever arms and positioned beneath the upwardly flaring walls of said bracket, resilient and deformable material interposed between the means connecting said lever arms and said walls, and additional means interconnecting said supporting members whereby oscillations of one of said members are partially transmitted into oscillations of the other members.

12. A road vehicle comprising a frame, tandem axles thereon, a trunnion between said axles, and a resilient suspension interposed between said axles and said trunnion comprising, means connecting each axle to said trunnion and oscillatory with respect to said vehicle frame, resilient and deformable material positioned to cushion oscillatory movements of said means, and means on said trunnion against which said material reacts, in combination with means for resiliently connecting said trunnion to said vehicle frame.

13. The invention as in claim 12 wherein the means for resiliently connecting said trunnion to said frame includes an arm supporting said trunnion and pivoted to the frame, with resilient and deformable material cushioning oscillatory movements of said arm.

In testimony whereof I affix my signature.

ALDEN G. RAYBURN.